(12) United States Patent
Khatami et al.

(10) Patent No.: US 11,594,015 B1
(45) Date of Patent: Feb. 28, 2023

(54) DETECTING CHANGES IN FOREST COMPOSITION (71) Applicant: FINITE CARBON CORPORATION, Wayne, PA (US)

(72) Inventors: Reza Khatami, Gainesville, FL (US); Donal O'Leary, Estes Park, CO (US); Jordan Golinikoff, Oakland, CA (US)

(73) Assignee: FINITE CARBON CORPORATION, Wayne, PA (US)

( * ) Notice: Subject to any disclaimer, the term of this patent is extended or adjusted under 35 U.S.C. 154(b) by 0 days.

(21) Appl. No.: 17/815,199

(22) Filed: Jul. 26, 2022

(51) Int. Cl.
*G06V 10/764* (2022.01)
*G06V 10/72* (2022.01)
*G06V 20/13* (2022.01)
*G06V 20/10* (2022.01)
*G06V 10/62* (2022.01)

(52) U.S. Cl.
CPC ........... *G06V 10/764* (2022.01); *G06V 10/62* (2022.01); *G06V 10/72* (2022.01); *G06V 20/13* (2022.01); *G06V 20/188* (2022.01); *G06V 20/194* (2022.01)

(58) Field of Classification Search
CPC .. G06V 10/764; G06V 20/194; G06V 20/188; G06V 10/72; G06V 10/62; G06V 20/13
See application file for complete search history.

(56) References Cited

U.S. PATENT DOCUMENTS

| | | | |
|---|---|---|---|
| 2021/0118117 A1* | 4/2021 | Albrecht | G06V 10/764 |
| 2021/0124920 A1* | 4/2021 | Stahlfeld | G06V 20/52 |
| 2022/0237407 A1* | 7/2022 | Umeda | G06K 9/6269 |
| 2022/0237858 A1* | 7/2022 | Dubost | G06T 15/506 |

OTHER PUBLICATIONS

Jin, S. et al., A comprehensive change detection method for updating the National Land Cover Database to circa 2011, Remote Sensing of Environment, 132: 159-175, 2013.

Bayr, C. et al., Satellite-based forest monitoring: spatial and temporal forecast of growing index and short-wave infrared band, Geospatial Health 2016, vol. 11: 310.

Engler, R. et al., Combining ensemble modeling and remote sensing for mapping individual tree species at high spatial resolution, Forest Ecology and Management, 310:64-73, 2013.

(Continued)

*Primary Examiner* — Utpal D Shah
(74) *Attorney, Agent, or Firm* — Fox Rothschild LLP (57) ABSTRACT

A method of producing a model to detect changes in forest cover is disclosed. The method includes obtaining forest-cover classification data of a land area. The land area includes one or more subregions having unchanged forest-cover classifications between a first time and a second time. The method further includes obtaining image data of the subregions at multiple times. For at least one forest-cover classification, the method includes applying a statistical analysis to the image data to determine one or more threshold values representing measurement variations. The method further includes comparing subsequently obtained image data to the one or more threshold values and classifying the one or more subregions as changed or unchanged based on the comparison of subsequently obtained image data to the one or more threshold values.

18 Claims, 6 Drawing Sheets

(56) References Cited

OTHER PUBLICATIONS

Zhu, Z. et al., Continuous change detection and classification of land cover using all available Landsat data, Remote Sensing of Environment 144: 152-171, 2014.

Cohen, W. et al., Detecting trends in forest disturbance and recovery using yearly Landsat time series: 2. TimeSync—tools for calibration and validation, Remote Sensing of Environment 114: 2911-2924, 2010.

Verbesselt, J. et al., Detecting trend and seasonal changes in satellite image time series, Remote Sensing of Environment 114: 106-115, 2010.

Kennedy, R. et al., Detecting trends in forest disturbance and recovery using yearly Landsat time series: 1. LandTrendr—Temporal segmentaiton algorithms, Remote Sensing of Environment 114: 2897-2910, 2010.

Kennedy, R. et al., Trajectory-based change detection for automated characterization of forest distrubance dynamics, Remote Sensing of Environment 110: 370-386, 2007.

Araujo, M. et al., Ensemble forecasting of species distributions, TRENDS in Ecology and Evolution, vol. 22. No. 1, 42-47, 2006.

Potapov, P. et al., High-Resolution Global Maps of 21st-Century Forest Cover Change, ResearchGate, Science, Nov. 2013.

A Landowner's Guide to Carbon Sequestration Credits: In association with the Commonwealth Project, Central Minnesota Regional Sustainable Development Partnership, 1-19.

Margono, B., Mapping and monitoring deforestation and forest degradation in Sumatra (Indonesia) using Landsat time series data sets from 1990 to 2010, 2012 Environ. Res. Lett. 7: 034010.

Vogelmann, J. et al., Monitoring gradual ecosystem change using Landsat time series analyses: Case studies in selected forest and rangeland ecosystems, USGS Staff—Published Research, 2012.

Hughes, M., New Remote Sensing Methods for Detecting and Quantifying Forest Distrubance and Regeneration in the Eastern United States, PhD diss., University of Tennessee, 2014.

Brooks, E. et al., On-the-Fly Massively Multitemporal Change Detection Using Staistical Quality Control Charts and Landsat Data, IEEE Transactions on Geoscience and Remote Sensing, vol. 52, No. 6, Jun. 2014.

Hughes, M. et al., Patch-Based Forest Change Detection from Landsat Time Series, Forests 2017, 8: 166.

Hermosila, T. et al., An integrated Landsat time series protocol for change detection and generation of annual gap-free surface reflectance composites, Remote Sensing of Environment, vol. 158, 220-234, Mar. 1, 2015.

Matricardi, E. et al., Assessment of tropical forest degradation by selective logging and fire using Landsat imagery, Remote Sensing of Environment, vol. 114, No. 5 ,1117-1129, May 17, 2010.

Ravindranath, N. et al., Deforestation and forest degradation in India—implications for REDD+, Current Science, vol. 102, No. 8, 1117-1125, Apr. 25, 2012.

Lehmann, E. et al., Forest cover trends from time series Landsat data for the Australian continent, International Journal of Applied Earth Observation and Geoinformation, vol. 21, 453-462, Apr. 2013.

Ahmed, O. et al., Interpretation of forest disturbance using a time series of Landsat imagery and canopy structure from airborne lidar, Canadian Journal of Remote Sensing, Jun. 4, 2014, vol. 39, Issue 6, 521-542.

Kayastha, N. et al., Monitoring Wetland Change Using Inter-Annual Landsat Time Series Data, Wetlands, 32: 1149-1162, 2012.

Gillanders, S. et al., Multitemporal remote sensing of landscape dynamics and pattern change: describing natural and antropogenic trends, Progress in Physical Geography: Earth and Environment, Oct. 1, 2008.

Hermosilla, T. et al., Regional detection, characterization and attribution of annual forest change from 1984 to 2012 using Landsat-derived time-series metrics, Remote Sensing of Environment, vol. 170, 121-132, Dec. 2015.

Koltunov, A. et al., Selective logging changes forest phenology in the Brazilian Amazon: Evidence from MODIS image time series analysis, Remote Sensing of Environment, vol. 113, Issue 11, 2431-2440, Nov. 16, 2009.

Xue, X. et al., Trajectory-based detection of urban expansion using Landsat time series, International Journal of Remote Sensing, vol. 35, Issue 4, 2014.

\* cited by examiner

DETECTING CHANGES IN FOREST COMPOSITION

BACKGROUND

Detecting changes in forest ecosystems across large spatial scales with high spatial and temporal resolution is an important component of monitoring, reporting, and verifying activities that can help to mitigate climate change. More broadly, change detection is useful for any forest landowners to better understand the state of the forest they own.

Large-scale, accurate monitoring of forested lands can be difficult, particularly for remote and/or uninhabited lands. Traditionally, comprehensive land monitoring has required some degree of human input. While some production steps are automated, difficult-to-classify satellite data (pixels) require human interpretation. Furthermore, some monitoring requires in-person assessment. Some forest-cover data classification sets include an online portal which lets users create custom reports on change to land cover. Time-consuming human assessment limits the ability to monitor forest change at large scale, such as many dozens of separate properties across an ecoregion, and/or limits the ability to quickly determine changes in forest cover of the properties. This, in turn, limits the ability to monitor, on an ongoing basis, compliance, by owners of the separate properties, with contractual obligations to maintain forest cover.

This document describes methods and systems that address issues such as those discussed above, and/or other issues.

SUMMARY

The present disclosure describes embodiments related to a method of producing a model to detect changes in forest cover. The method includes obtaining forest-cover classification data of a land area. The land area includes one or more subregions having unchanged forest-cover classifications between a first time and a second time. The method further includes obtaining image data of the one or more subregions at multiple times from the first time to the second time. For at least one forest-cover classification, the method includes applying a statistical analysis to the image data to determine one or more threshold values representing measurement variations from the first time to the second time. The method further includes comparing subsequently obtained image data of the one or more subregions to the one or more threshold values and classifying the one or more subregions as changed or unchanged based on the comparison of subsequently obtained image data to the one or more threshold values.

Implementations of the disclosure may include one or more of the following optional features. In some implementations, obtaining the forest-cover classification data of the land area includes obtaining first forest-cover classification data of the land area captured at the first time (including multiple subregions, each subregion having an associated first forest-cover classification), obtaining second forest-cover classification data of the land area captured at the second time, and comparing the first and second forest-cover classifications of the subregions to identify one or more subregions having the same forest-cover classification at the first time and the second time. The image data may include measurements of reflected light within one or more spectral bands. The image data may further include one or more indices determined from the measurements of reflected light. In some examples, applying the statistical analysis to the image data includes applying the statistical analysis to each of multiple spectral bands or the one or more indices. The forest-cover classification data may include a land cover classification set. The forest-cover classification data may have a spatial resolution of 30 square meters or less. The forest-cover classification can be a single forest class or can be multiple classes of different types of forest. At least one of the one or more spectral bands may include near infrared.

In an embodiment, a method of monitoring forest cover is disclosed. The method includes, by a processor of an electronic device, receiving boundary information of a land area and receiving a model configured to detect a change in forest cover. The model is based on a statistical analysis of image data for multiple subregions having unchanged forest-cover classification over a period of time. The method further includes receiving subsequent image data for the land area and applying the model to the received image data to classify the land area as having changed forest cover or having unchanged forest cover.

Implementations of the disclosure may include one or more of the following optional features. In some implementations, the image data includes measurements of reflected light within one or more spectral bands. The image data may include one or more indices determined from the measurements of reflected light.

In an embodiment, a system for producing a model to detect changes in forest cover is disclosed. The system includes a processor and a memory that stores programming instructions. The programming instructions are configured to cause the processor to obtain forest-cover classification data of a land area including one or more subregions having unchanged forest-cover classifications between a first time and a second time. The programming instructions are further configured to cause the processor to obtain image data of the one or more subregions at multiple times from the first time to the second time. For at least one forest-cover classification, the programming instructions are further configured to cause the processor to apply a statistical analysis to the image data to determine one or more threshold values representing measurement variations from the first time to the second time. The programming instructions are further configured to compare subsequently obtained image data of the one or more subregions to the one or more threshold values and classify the one or more subregions as changed or unchanged based on the comparison of subsequently obtained image data to the one or more threshold values.

Implementations of the disclosure may include one or more of the following optional features. In some implementations, the programming instructions are configured to obtain first forest-cover classification data of the land area captured at the first time, the first forest-cover classification data including multiple subregions, each of the subregions having an associated first forest-cover classification, obtain second forest-cover classification data of the land area captured at the second time, the second forest-cover classification data including the subregions, each of the subregions having an associated second forest-cover classification, and compare the first and second forest-cover classifications of the subregions to identify one or more subregions having the same forest-cover classification at the first time and the second time.

The image data may include measurements of reflected light within one or more spectral bands. The image data may further include one or more indices determined from the measurements of reflected light. In some examples, the programming instructions that are configured to cause the processor to apply the statistical analysis include programming instructions that are configured to cause the processor to apply the statistical analysis to each of multiple of the one or more spectral bands or the one or more indices. The forest-cover classification data may be a gridded forest classification dataset.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun or phrase, such use is simply intended to distinguish one item from another and is not intended to require a sequential order unless specifically stated. The term "about" when used in connection with a numeric value, is intended to include values that are close to, but not exactly, the number. For example, in some embodiments, the term "about" may include values that are within +/−10 percent of the value.

The present disclosure relates generally to methods and systems for detecting change in forest composition over time. Atmospheric greenhouse gasses, including carbon dioxide ($CO_2$), are the primary drivers of global climate change. $CO_2$ is naturally captured and removed from the atmosphere through biological, chemical, and physical processes, including photosynthesis. The $CO_2$ removed from the atmosphere by a forest, e.g., through photosynthesis, can offset the $CO_2$ (or other greenhouse gas) emitted through other processes, such as burning fossil fuels. Thus, the owner of forested land can earn a credit (e.g., a carbon credit) for the $CO_2$ removed from the atmosphere. The landowner can sell these credits (rights), individually or in aggregate, in markets developed for this purpose.

In some examples, the landowner may voluntarily enroll in a program to maintain the forest, and the forest's ongoing ability to remove greenhouse gasses through photosynthesis, in exchange for marketable carbon credits. The landowner enrolls one or more specific properties, e.g., land areas within defined boundaries. The landowner may be required to furnish evidence of compliance with continued maintenance of the forest of the land areas in order to receive credits. Efficient (e.g., automated) and objective approaches to monitoring the forest cover of enrolled land simplifies the process for landowners and project developers and provides assurances to regulators, standards bodies, and verification bodies that the stated climate benefits of a given project are real.

While image-processing systems exist that can detect changes in landcover and forest stocking, they often are built to detect changes in cover type and often have a temporal lag in their production. Many current product also do not track smaller changes within forested areas, e.g., that are not transitioned into other land uses. This document describes systems and methods that address these issues.

Figure 1:
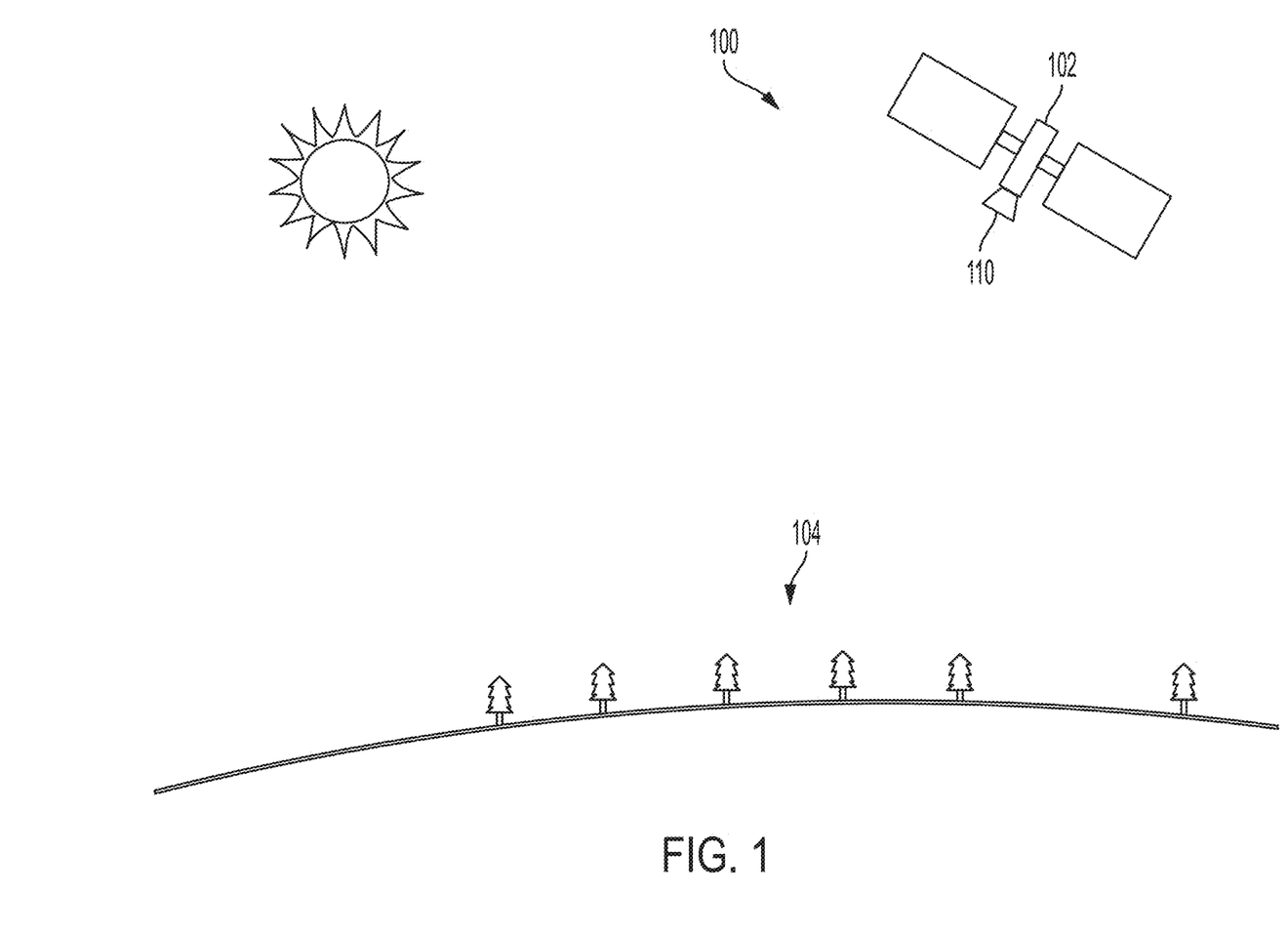
FIG. 1 shows an example environment for monitoring forest cover.

FIG. 1 shows an example environment 100 for monitoring forests 104 over large geographical regions, such as continents. The systems and methods may also monitor smaller regions, such as subregions of a continent. In some embodiments, the system may include an imaging device 110 such as a camera or similar device configured to capture raster images, e.g., arrays of pixels, where each pixel represents an acquired measurement of light (electromagnetic radiation) received over a period of time from a small area (defined as a pixel size) of the forest. In some examples, the imaging device acquires light measurement only within a range or band of wavelengths (colors or bins of the electromagnetic spectrum). In some examples, the imaging device simultaneously acquires light measurements within separate bands, such that each pixel represents multiple measurements, each measurement associated with a separate bin of radiation, such as Red, Green, Blue (RGB), or Near-infrared (NIR). Here, the imaging device 110 is mounted on a satellite 102 and facing toward the Earth, such that the radiation captured is sunlight reflected off of the earth's surface. In some examples, the imaging device transmits a signal, such as visible light or other electromagnetic radiation, which is then reflected from the Earth's surface and captured by sensors on the satellite. The satellite 102 may be in a low-earth orbit configured to allow the satellite to pass over different areas of the Earth's surface. The imaging device 110 may be configured to measure light reflected from points of the Earth's surface when those points are in the field of view (of the imaging device 110) during the satellite's orbit. The imaging device 110 may be configured to measure light within particular wavelengths or frequency bands, e.g., near infrared, red, green, blue, etc. In some examples, the imaging device measures several distinct wavelength ranges (e.g., bands) simultaneously. Each wavelength band may provide a unique or advantageous measurement of the conditions that are found at that location. For example, measurements in the green band may emphasize detecting vegetation. Measurements in the infrared band may provide enhanced penetration of fog and/or haze. Enhanced penetration may be advantageous for satellite-based sensors which are positioned above the Earth's atmosphere. And imaging devices 110 positioned closer to the Earth's surface may measure surface reflection more accurately in all frequency bands.

In some examples, the imaging device 110 is configured to measure light within multiple frequency bands simultaneously. That is, for a particular measurement period and a particular point of the Earth's surface, the imaging device 110 may acquire a set of measurements, e.g., a separate measurement for each frequency band. In examples where the imaging device 110 measures several distinct wavelength ranges (e.g., bands) simultaneously, the separate measurements of light in different spectral bands may be analyzed and/or combined to provide additional information than provided by a single frequency band. For example, one frequency band may be strongly reflected by vegetation and another frequency band may be strongly absorbed by vegetation. In this case, the two measurements can be combined to form a normalized difference measurement, i.e., the difference of the measurements divided by the sum of the measurements. The normalized difference may provide more accurate measurement of forest cover than either individual measurement. Standard combinations of measurements may be called indices. The imaging device 110 may be configured to provide high resolution images when in low-earth orbit. For example, the imaging device may be configured to have a spatial resolution as high as half a meter.

Figure 2:
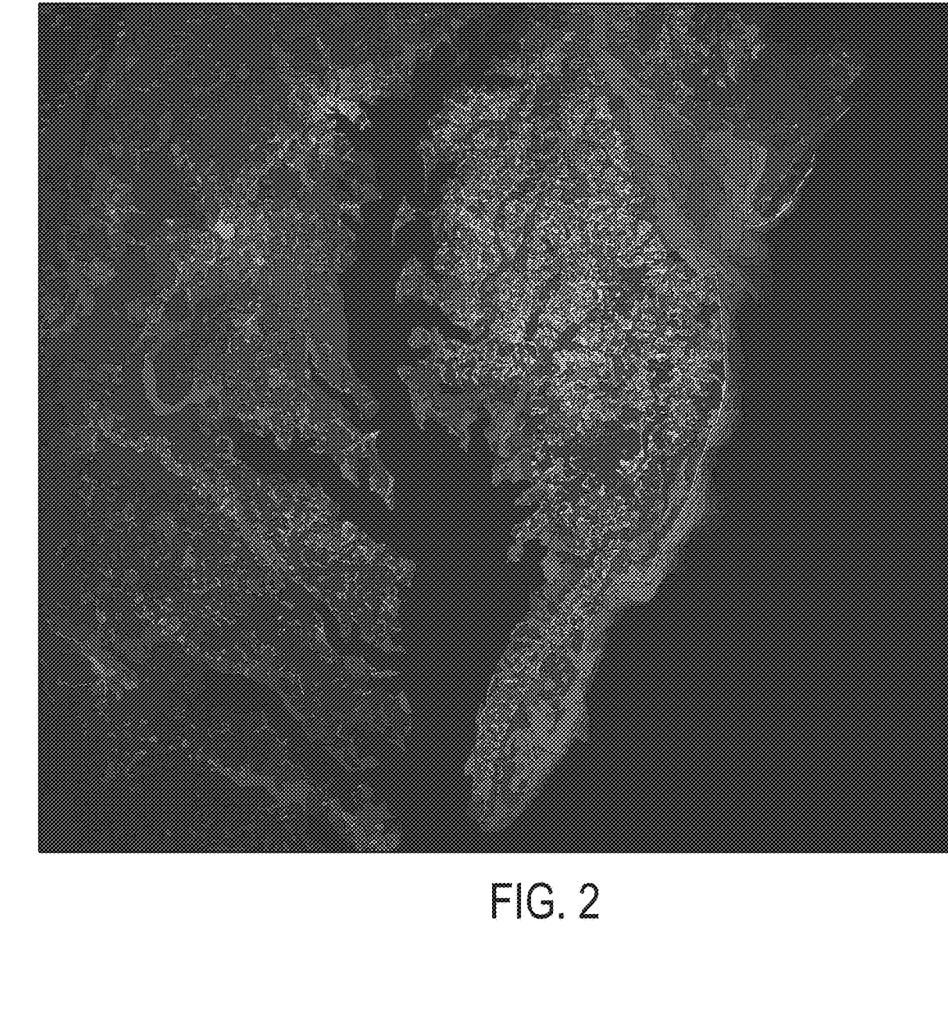
FIG. 2 shows an example Landsat analysis ready data tile showing the mid-Atlantic US as a grey scale image composite of bands X, Y, and Z

FIG. 2 shows example sensor data at a point in time. Here, the data depicts a portion of the Earth's surface. The depicted portion may include land within an ecoregion, i.e., a relatively large region (e.g., up to the continental scale) containing substantially a single ecosystem or a small number of ecosystems having substantially similar phenological characteristics. The ecoregion may include forested and unforested land. The example sensor data may include measurements of light reflected from the ecoregion within multiple separate frequency bands. Typically, governmental agencies that collect, warehouse, and serve satellite data group this data into categories depending on the level of processing associated with the sensor data. The lowest level data products are the raw data collected by the sensors. The next level of data usually involves calibrating and correcting raw data to better reflect the surface reflectance after removing atmospheric effects. Combinations of separate corrected measurements into one or more index values per pixel, e.g., according to a standard index, such as the normalized difference vegetation index (NDVI) could be considered a $3^{rd}$ category of data. In some examples, the portion of the Earth's surface represented by individual pixels of the sensor data is defined by the spatial resolution of the sensor. Each pixel may have an associated land-use classification, e.g., a classification applied by a government agency, such as the U.S. Geological Survey, based on expert assessment of the land and associated data. The land-use classification may distinguish forested lands from, e.g., developed land or from barren land. The land-use classification may further distinguish types of forested lands, e.g., deciduous, coniferous, mixed, etc. In some examples, a forest-cover classification is derived from the land-use classification. For example, all non-forest land-use classes may be summarized by a single class of "non-forest."

Figure 3:
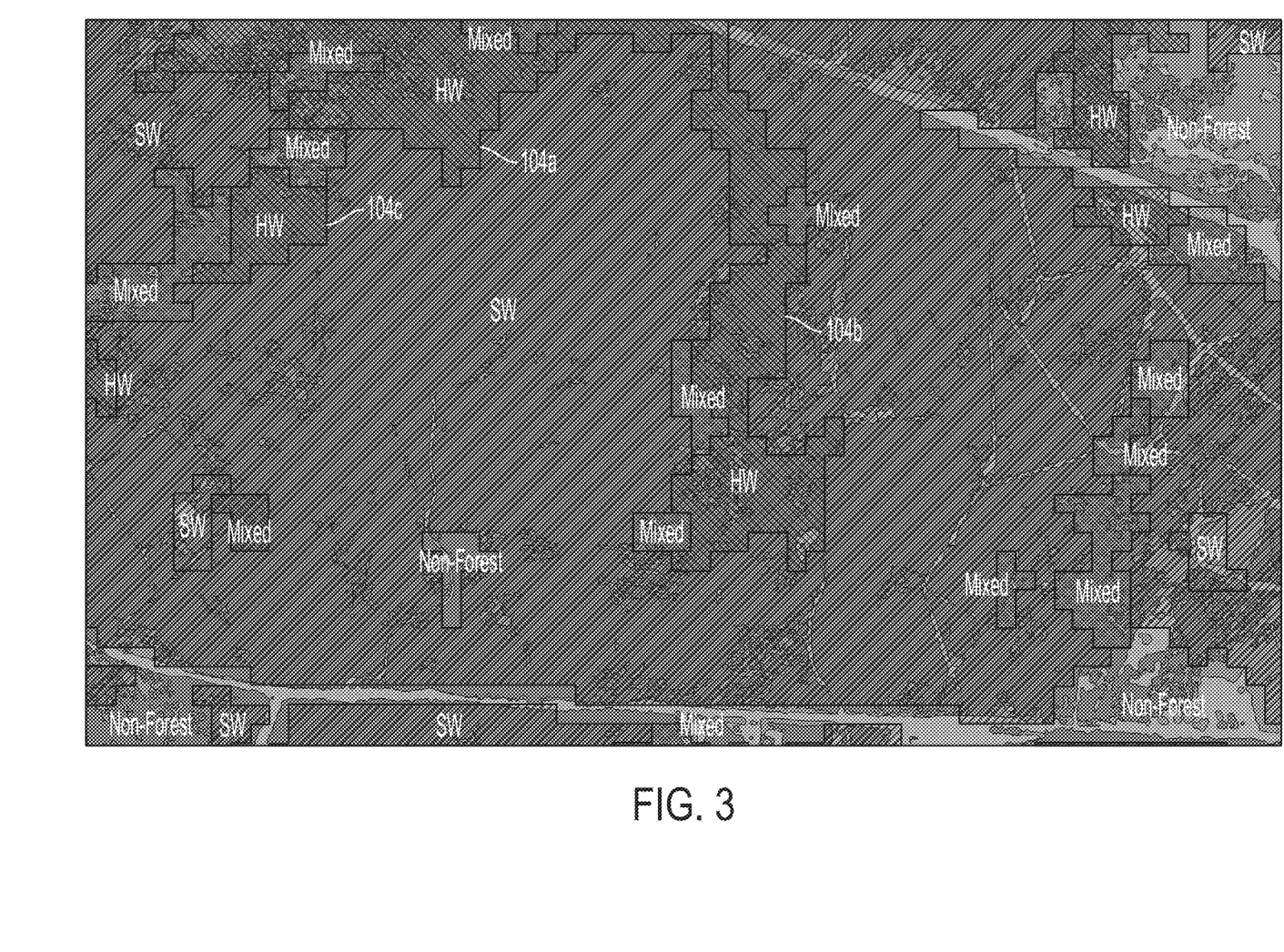
FIG. 3 shows forested subregions.

FIG. 3 shows forested subregions 104, 104a-c of an ecoregion. Each subregion 104 may be individually owned or owned by multiple landowners. Each subregion 104 may be enrolled in a program to earn carbon credits in return for maintaining the forest in the subregion. The program may include monitoring of the subregion 104 to assess adherence to forest maintenance obligations. For example, the program may continually monitor the subregions to detect changes to the forest cover. If a change is detected, the program may inform the subregion owner of the anomaly and ask for further assurances that the owner is maintaining the subregion in accordance with the program.

Figure 4:
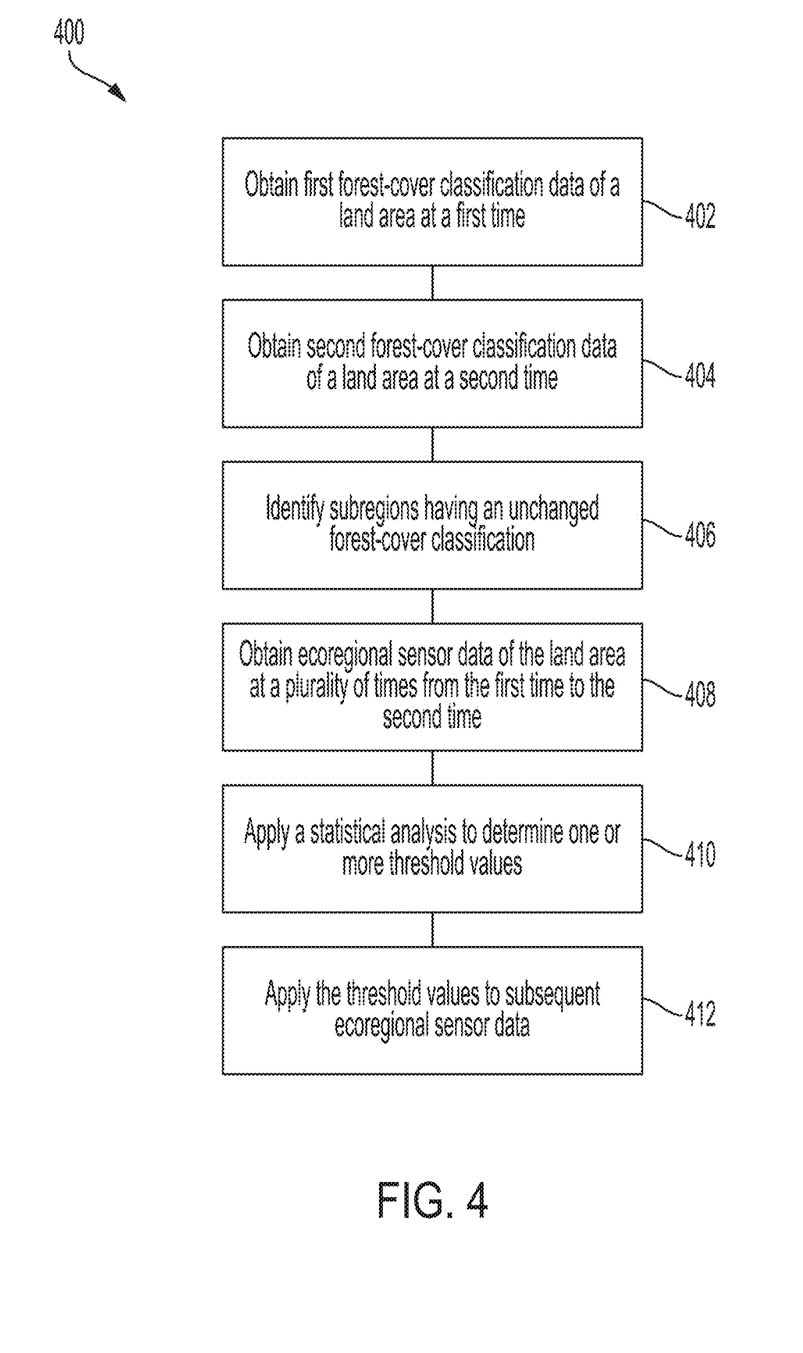
FIG. 4 is a flowchart of a method of detecting forest cover change.

FIG. 4 shows a flowchart 400 of a method of detecting forest cover change. At step 402, the method includes obtaining first forest-cover classification data of a land area at a first time. The data may come from a public source such as the National Land Cover Database (NLCD). Each pixel may also include an associated forest-cover classification. In some examples, the forest-cover classification label associated with each pixel is based on human assessment and/or expertise. In other cases, the classification is based on supervised or unsupervised modeling. At step 404, the method includes obtaining second forest-cover classification dataset of a land area at a second time. For example, the period between the first time and the second time may be 2-3 years. At step 406, the method includes comparing the forest-cover classifications of the first dataset and the second dataset to identify subregions with unchanged forest-cover classifications during the period.

At step 408, the method includes obtaining sensor data of the subregions having an unchanged forest-cover classification during the period of time between the two classification datasets. For example, the sensor data may include publicly available Landsat data, e.g., from the U.S. Geological Survey (USGS), indicating surface reflectance at a spatial resolution of 30 meters per pixel. As described above, the sensor data may include measurements of light within specific frequency bands and/or separate measurements combined into one or more index values per pixel (e.g., as in the case of a normalized difference index). For example, Landsat 8-9 Operational Land Imager (OLI) and Thermal Infrared Sensor (TIRS) bands include the following.

| Bands | | Wavelength (micrometers) |
|---|---|---|
| Band 1 | Coastal aerosol | 0.43-0.45 |
| Band 2 | Blue | 0.45-0.51 |
| Band 3 | Green | 0.53-0.59 |
| Band 4 | Red | 0.64-0.67 |
| Band 5 | Near Infrared (NIR) | 0.85-0.88 |
| Band 6 | SWIR 1 | 1.57-1.65 |
| Band 7 | SWIR 2 | 2.11-2.29 |
| Band 8 | Panchromatic | 0.50-0.68 |
| Band 9 | Cirrus | 1.36-1.38 |
| Band 10 | Thermal Infrared (TIRS) 1 | 10.6-11.19 |
| Band 11 | Thermal Infrared (TIRS) 2 | 11.50-12.51 |

In addition to Landsat data, this method may also include obtaining sensor data from other passive optical sensors like those mounted on the Copernicus satellite owned by the European Space Agency. It may also include data obtained by active sensors that emit electromagnetic radiation pulses in the microwave and radio frequency portion of the electromagnetic spectrum (~1 meter to ~1 cm wavelength). It may also include light detection and ranging sensors (LiDAR) operating at wavelengths in the range, e.g., of 900 nm to 1550 nm.

Irrespective of the underlying sensor dataset, for each pixel, the sensor data provide a time-series of values during the period of interest, forming a temporal signature which can be analyzed. At step 410, the method includes applying a statistical analysis to the sensor data of unchanged subregions. For example, for each forest-cover classification and each measured spectral band and index, the method may determine the highest and lowest values, the mean value and the standard deviation of the values per day-of-year. This method may also use smoothing algorithms or denoising approaches or other signal-processing approach to improve the signal to noise ratio in the features constructed as predictors in any models. These statistics may vary for different days-of-year due to forest phenological processes over a year. From these statistics, an "envelope" can be calculated indicating reasonably expected values for the forest-cover classification and the spectral band (or derived index). For example, an envelope may include values within one or a few standard deviations of the mean value. Envelopes may also be defined using quantiles. Envelopes may be defined using any moments of the distribution of the data on a given day. Envelopes may use the raw band or index band values or may use moving windows of varying sizes, majority voting, or other data smoothing techniques before calculating envelope values. Subsequently obtained sensor data that fall outside the thresholds of the expected range may indicate an inconsistency with an unchanged forest cover classification.

For each measured spectral band and index the statistical analysis combines sensor data from all unchanged pixel values of the same forest-cover classification to determine the envelope of expected values. Thus, the resulting model may include many envelopes per forest-cover classification and per measured spectral band (and/or index). The envelopes are calculated using the existing forest/land-cover classification maps as reference data with sensor data from the same period as the classification maps. Subsequently obtained sensor data for subregions of a forest-cover that fall outside of these calculated envelopes (i.e., —the bounds of expected ranges) for any of the spectral bands and/or indices for that forest-cover classification may indicate a disturbance or change in the conditions on the ground and therefore a change in the forest cover classification. The process may be repeated for each forest-cover classification and each spectral band and/or index to produce a model including threshold values which may be applied to subsequently obtained sensor data. The areas analyzed for changes in forest condition may include properties enrolled in a forest-management program.

In some examples, the aggregate result of applying multiple thresholds to values of a single pixel is determined by a weighted combination of each individual comparison or envelope. The aggregation of multiple modeled predictions is often referred to as an ensemble model. For example, the outputs of each comparison may be weighed equally, resulting in a "majority vote" of whether the pixel experienced forest disturbance. In other examples, each comparison may be weighted differently, e.g., based on the ability of measurements in the spectral band to identify a forest-cover change. For example, forest-thinning machinery may produce a proportionally larger change in "soil" index than other indices or particular spectral bands. In other examples, outputs of each comparison are logically combined, e.g., so that all thresholds must be exceeded to indicate a disturbance or change in forest-cover classification, or if any signal is outside of the expected envelope this could indicate disturbance or changed forest-cover classification. Other ensemble combinations of individual threshold comparisons are also within the scope of this disclosure, including arbitrarily complex combinational logic. For example, threshold features may be combined using a machine learning model (e.g., Random Forests) to group and choose threshold features that reduce an error term for a validation set of data.

At step 412, the method includes applying the results of the ensemble of envelopes to subsequent ecoregional sensor data to one or more measurements indicating a change in forest cover. The method may include applying the threshold values to each pixel of the subsequently acquired sensor data and may include applying threshold values for each of multiple spectral bands for the previously determined forest-cover classification of the pixel. The applied threshold values may indicate properties which have undergone (or may be undergoing) a forest-cover change which is inconsistent with the obligations of the property owner under a carbon-credit agreement or may be used for other land management purposes.

Figure 5:
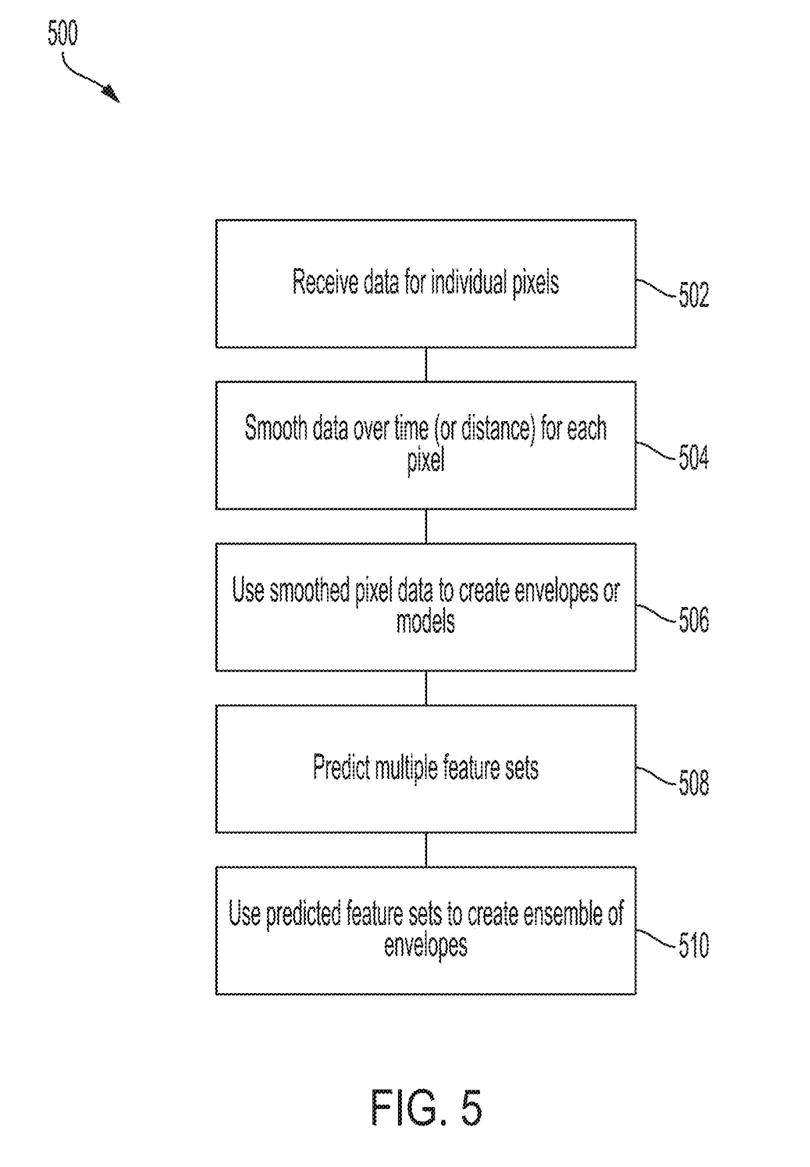
FIG. 5 is a flowchart of a method of creating an ensemble of envelopes.

FIG. 5 shows a flowchart 500 of a method of creating an ensemble of envelopes. At step 502, the method includes receiving data for individual pixels of sensor data, e.g., image or other sensor data of properties enrolled in a forest-management program. In some examples, each pixel includes multiple pixel values. For example, each pixel may include measurements from multiple sensors, and/or multiple frequency bands within a single sensor, such as both green and infrared, and/or combinations of bands as spectral indices. At step 504, the method includes smoothing data over time (or distance) for each pixel. That is, pixel values may be combined with spatially adjacent pixels values, e.g., using a weighted average that takes into account the relative positions of the adjacent pixels. In some examples, pixels are combined into a single value that represents, e.g., the largest pixel value or the most common pixel value in the neighborhood of pixels. Pixel values may also be smoothed over time, e.g., by applying a low-pass filter, such as a weighted moving average, to a time-ordered series of pixel values. Alternatively, the low-pass filter may select the median pixel value (or maximum value) within a time window. In some examples, the pixel data includes multiple values. Each value (e.g., the value associated with each separate frequency band) may be separately smoothed and may be smoothed using separate approaches. For example, some pixel values may be smoothed both spatially and temporally, and other values associated with the same pixel may be temporally smoothed, but not spatially smoothed.

At step 506, the method includes using the smoothed pixel data to create envelopes or models. The models may represent expected trends overtime or ranges of values for a pixel having an unchanged forest-cover classification. That is, each model may be a predictor of a change (or a lack of change) in the forest-cover classification of the land associated with the pixel data, based on empirical data associated with the land. For example, an envelope may be based on the variance (or standard deviation) of smoothed pixel values over a time period, such that future pixel values that fall outside the envelope may predict a change in forest-cover classification. Models may be based on pixel values or value trends (e.g., first or second derivative of pixel value changes over time). Trend-based models may predict forest-cover change based on empirical trend data, such that future pixel value trends that fall outside an envelope may predict a change in forest-cover classification. In some examples, the method includes creating models for each of multiple pixel values, e.g., separate models for each frequency band. At step 508, the method includes predicting multiple feature sets. For example, the method may include creating separate models for each of a variety of time periods, each model potentially having a separate envelope. In some examples, models associated with a longer time period have a wider (more inclusive) envelope, and models associated with a shorter time period have a narrower envelope. The width of the envelope varies for each day of the year or depending on the data included in the model. The method may include creating both value-based models and trend-based models for each of a variety of time periods. At step 510, the method includes using the predicted feature sets to create an ensemble model. For example, the ensemble may include a suite of separate models, e.g., value-based and/or trend-based, each model associated with one or more periods of time. Each model may be associated with a particular frequency band. The ensemble of models may be applied to subsequently acquired sensor data to predict a change in forest-cover classification. In some examples, the models are applied to sensor data in an ordered series or cascade, such that when one model predicts a forest-cover change, the remainder of models in the ensemble are not applied. In some examples, the entire ensemble of models is applied to subsequently acquired sensor data, and the result of each of the models is combined (e.g., averaged) to obtain an ensemble result. In some examples, the average is a weighted average that emphasizes particular models over other models.

Figure 6:
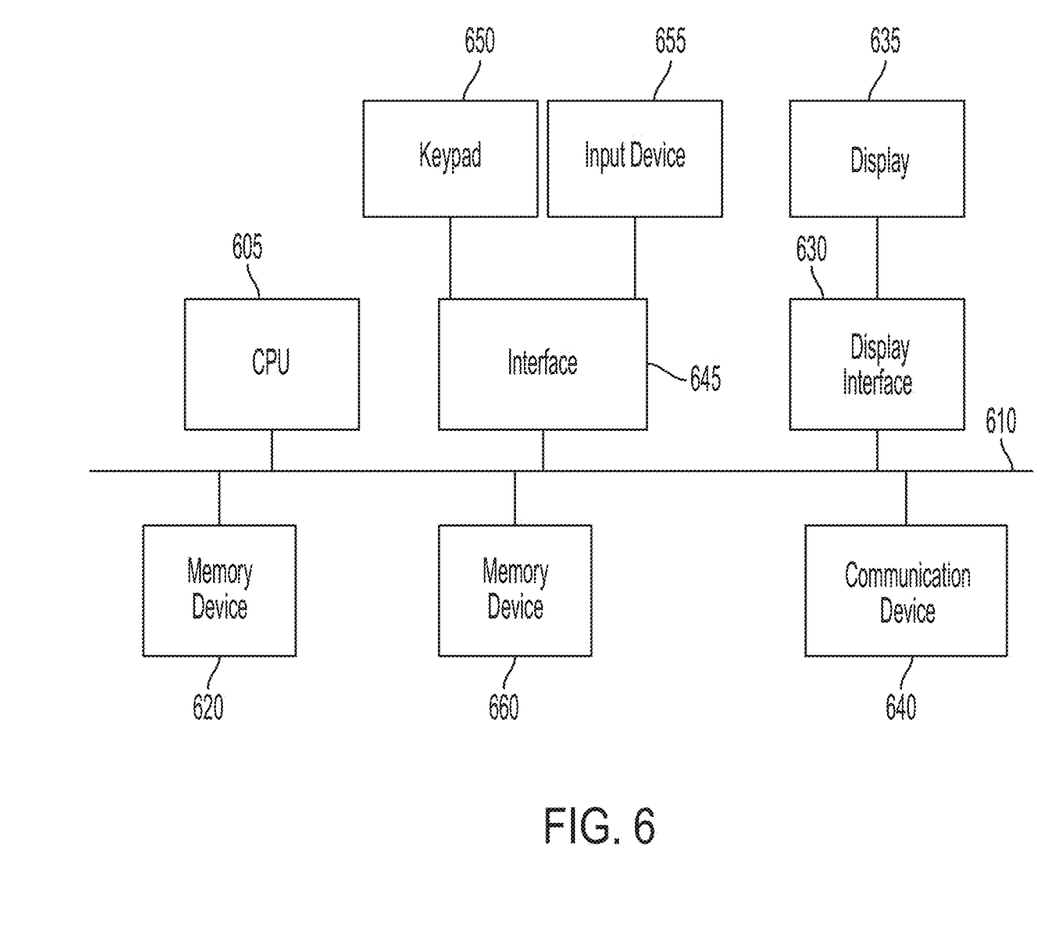
FIG. 6 illustrates a block diagram of internal hardware included in any of the electronic components of this disclosure.

FIG. 6 illustrates example hardware that may be used to contain or implement program instructions. A bus 610 serves as the main information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor 605 or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 620. Read only memory (ROM) and random-access memory (RAM) constitute examples of non-transitory computer-readable storage media 620, memory devices or data stores as such terms are used within this disclosure.

Program instructions, software or interactive modules for providing the interface and performing any querying or analysis associated with one or more data sets may be stored in the memory device 620. Optionally, the program instructions may be stored on a tangible, non-transitory computer-readable medium such as a compact disk, a digital disk, flash memory, a memory card, a universal serial bus (USB) drive, an optical disc storage medium and/or other recording medium.

An optional display interface 630 may permit information from the bus 610 to be displayed on the display 635 in audio, visual, graphic or alphanumeric format. Communication with external devices may occur using various communication ports 640. A communication port 640 may be attached to a communications network, such as the Internet or an intranet.

An optional display interface 630 may permit information from the bus 610 to be displayed on a display device 635 in visual, graphic or alphanumeric format, such on an in-dashboard display system of the vehicle. An audio interface and audio output (such as a speaker) also may be provided. Communication with external devices may occur using various communication devices 640 such as a wireless antenna, a radio frequency identification (RFID) tag and/or short-range or near-field communication transceiver, each of which may optionally communicatively connect with other components of the device via one or more communication system. The communication device(s) 640 may include a transmitter, transceiver, or other device that is configured to be communicatively connected to a communications network, such as the Internet, a Wi-Fi or local area network or a cellular telephone data network, or to make a direct communication connection with one or more nearby devices, such as a Bluetooth transmitter or infrared light emitter.

The hardware may also include a user interface sensor 645 that allows for receipt of data from a keyboard or keypad 650 or other input devices 655 such as, a joystick, a touchscreen, a touch pad, a remote control, a pointing device and/or microphone. Digital image frames also may be received from a camera 660 that can capture video and/or still images.

In this document, an "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

A "machine learning model" or a "model" refers to a set of algorithmic routines and parameters that can predict an output(s) of a real-world process (e.g., identification or classification of an object) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology. A machine learning model may be trained on a sample dataset (referred to as "training data").

In this document, the term "wireless communication" refers to a communication protocol in which at least a portion of the communication path between a source and destination involves transmission of a signal through the air and not via a physical conductor, as in that of a Wi-Fi network, a Bluetooth connection, or communications via another short-range or near-field communication protocol. However, the term "wireless communication" does not necessarily require that the entire communication path be wireless, as part of the communication path also may include a physical conductors positioned before a transmitter or after a receiver that facilitate communication across a wireless position of the path.

While the invention has been described with specific embodiments, other alternatives, modifications and variations will be apparent to those skilled in the art. Accordingly, it will be intended to include all such alternatives, modifications, and variations within the spirit and scope of the appended claims.

The invention claimed is:

1. A method of producing a model to detect changes in forest cover, the method comprising:
   obtaining forest-cover classification data of a land area comprising one or more subregions having unchanged forest-cover classifications between a first time and a second time;
   obtaining image data of the one or more subregions at a plurality of times from the first time to the second time;
   for at least one forest-cover classification, applying a statistical analysis to the image data to determine one or more threshold values representing measurement variations from the first time to the second time;
   comparing subsequently obtained image data of the one or more subregions to the one or more threshold values; and
   classifying the one or more subregions as changed or unchanged based on the comparison of subsequently obtained image data to the one or more threshold values.

2. The method of claim 1, wherein obtaining the forest-cover classification data of the land area comprises:
   obtaining first forest-cover classification data of the land area captured at the first time, the first forest-cover classification data comprising a plurality of subregions, each of the plurality of subregions having an associated first forest-cover classification;
   obtaining second forest-cover classification data of the land area captured at the second time, the second forest-cover classification data comprising the plurality of subregions, each of the plurality of subregions having an associated second forest-cover classification; and
   comparing the first and second forest-cover classifications of the plurality of subregions to identify one or more subregions having the same forest-cover classification at the first time and the second time.

3. The method of claim 1, wherein the image data comprises measurements of reflected light within one or more spectral bands.

4. The method of claim 3, wherein the image data further comprises one or more indices determined from the measurements of reflected light.

5. The method of claim 4, wherein applying the statistical analysis to the image data comprises applying the statistical analysis to each of a plurality of the one or more spectral bands or the one or more indices.

6. The method of claim 1, wherein the forest-cover classification data comprises a land cover classification data set.

7. The method of claim 1, wherein the forest-cover classification data has a spatial resolution of 30 square meters or less.

8. The method of claim 1, wherein the forest-cover classifications can be a single forest class or can be multiple classes of different types of forest.

9. The method of claim 3, wherein at least one of the one or more spectral bands comprises near infrared.

10. A method of monitoring forest cover comprising, by a processor of an electronic device:
    receiving boundary information of a land area;
    receiving a model configured to detect a change in forest cover based on a statistical analysis of image data for a plurality of subregions having unchanged forest-cover classification over a period of time;
    receiving subsequent image data for the land area; and
    applying the model to the received image data to classify the land area as having changed forest cover or having unchanged forest cover.

11. The method of claim 10, wherein the image data comprises measurements of reflected light within one or more spectral bands.

12. The method of claim 11, wherein the image data further comprises one or more indices determined from the measurements of reflected light.

13. A system for producing a model to detect changes in forest cover, the system comprising:
    a processor; and
    a memory that stores programming instructions that are configured to cause the processor to:
       obtain forest-cover classification data of a land area comprising one or more subregions having unchanged forest-cover classifications between a first time and a second time;
       obtain image data of the one or more subregions at a plurality of times from the first time to the second time;
       for at least one forest-cover classification, apply a statistical analysis to the image data to determine one or more threshold values representing measurement variations from the first time to the second time;
       compare subsequently obtained image data of the one or more subregions to the one or more threshold values; and
       classify the one or more subregions as changed or unchanged based on the comparison of subsequently obtained image data to the one or more threshold values.

14. The system of claim 13, wherein the programming instructions that are configured to cause the processor to obtain the forest-cover classification data comprise programming instructions configured to cause the processor to:
    obtain first forest-cover classification data of the land area captured at the first time, the first forest-cover classification data comprising a plurality of subregions, each of the plurality of subregions having an associated first forest-cover classification;
    obtain second forest-cover classification data of the land area captured at the second time, the second forest-cover classification data comprising the plurality of subregions, each of the plurality of subregions having an associated second forest-cover classification; and
    compare the first and second forest-cover classifications of the plurality of subregions to identify one or more subregions having the same forest-cover classification at the first time and the second time.

15. The system of claim 13, wherein the image data comprises measurements of reflected light within one or more spectral bands.

16. The system of claim 15, wherein the image data further comprises one or more indices determined from the measurements of reflected light.

17. The system of claim 16, wherein the programming instructions that are configured to cause the processor to apply the statistical analysis comprise programming instructions that are configured to cause the processor to apply the statistical analysis to each of a plurality of the one or more spectral bands or the one or more indices.

18. The system of claim 14, wherein forest-cover classification data is a gridded forest classification data set.

* * * * *

UNITED STATES PATENT AND TRADEMARK OFFICE
CERTIFICATE OF CORRECTION

| | |
|---|---|
| PATENT NO. | : 11,594,015 B1 |
| APPLICATION NO. | : 17/815199 |
| DATED | : February 28, 2023 |
| INVENTOR(S) | : Reza Khatami et al. |

It is certified that error appears in the above-identified patent and that said Letters Patent is hereby corrected as shown below:

On the Title Page

Item (72) The spelling of the last name for inventor Jordan Golinikoff should be corrected to read "Jordan Golinkoff".

Signed and Sealed this
Sixteenth Day of May, 2023

Katherine Kelly Vidal
*Director of the United States Patent and Trademark Office*